2,844,580

(1-PIPERAZINYL) ALKYLDITHIOCARBAMIC ACIDS

Bruce A. Ashby, Schenectady, N. Y., and Edgar C. Britton and Lee H. Horsley, Midland, Mich., assignors to The Dow Chemical Company, Midland, Mich., a corporation of Delaware No Drawing. Application September 9, 1957
Serial No. 682,608

5 Claims. (Cl. 260—268)

The present invention relates to dithiocarbamic acids and more particularly to (1-piperazinyl)alkyl dithiocarbamic acids having the formula

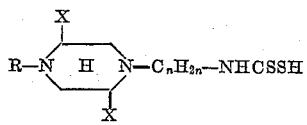

wherein R represents hydrogen or lower aminoalkyl, $n$ represents an integer of from 2 to 4, inclusive, and each X represents hydrogen or methyl. The expression lower alkyl is employed in the present specification and claims to refer to aliphatic hydrocarbon radicals containing from 1 to 4 carbon atoms, inclusive. The expression

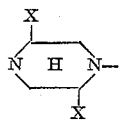

is employed in the present specification and claims to refer to saturated ring structures. The new compounds are crystalline solids somewhat soluble in many common organic solvents and substantially insoluble in water. These compounds have been found to be useful as parasiticides and are adapted to be employed in liquid and dust compositions for the control of many insect pests, fungi and bacteria.

The new compounds may be prepared by reacting an 1-(aminoalkyl)piperazine with carbon disulfide. The reaction is somewhat exothermic and proceeds smoothly at temperautres of from 0° C. to room temperature. The temperature conveniently may be controlled by regulating the rate of contacting the reactants and/or by external cooling. Preferably, the reaction may be carried out in the presence of an inert organic solvent such as benzene. Good results are obtained when employing substantially equimolecular proportions of the reactants.

In a preferred manner of carrying out the reaction, carbon disulfide dissolved in an inert organic solvent such as benzene is slowly added portionwise to a 1-(aminoalkyl)piperazine. The addition is carried out with stirring and cooling at a temperature of from 0° C. to room temperature. It is to be understood that the order of contacting the reactants is not critical and that the amine may be added to the carbon disulfide. During the addition a precipitate oftentimes forms in the reaction zone. Upon completion of the reaction, the precipitate which forms is separated in conventional manner such as filtration or decantation. The desired product may be purified by recrystallization from a suitable organic solvent. The following examples are illustrative of the present invention but are not to be construed as limiting.

*Example 1.—2-(1-piperazinyl)ethyldithiocarbamic acid*

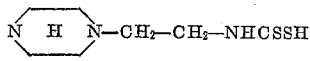

15.25 grams (0.2 mole) of carbon disulfide dissolved in benzene was slowly added portionwise to 1-(2-aminoethyl)piperazine (25.8 grams; 0.2 mole) dissolved in benzene. The addition was carried out with stirring and cooling at a temperature of about 25° C. During the addition a white crystalline solid precipitated in the reaction mixture. Upon completion of the reaction, as evidenced by the substantial cessation of formation of precipitate, the precipitate was separated by filtration to obtain a 2-(1-piperazinyl)ethyldithiocarbamic acid product which was found to melt at 180° C.–185° C. Analysis for carbon, hydrogen, nitrogen and sulfur:

|  | C | H | N | S |
|---|---|---|---|---|
| Found | 40.22 | 7.66 | 29.79 | 19.14 |
| Calc | 40.93 | 7.32 | 31.20 | 20.45 |

*Example 2.—3 - (2,5 - dimethyl - 1 - piperazinyl)propyldithiocarbamic acid*

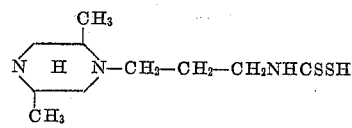

8.95 grams (0.1177 mole) of carbon disulfide dissolved in benzene was slowly added portionwise to 1-(3-aminopropyl) - 2,5 - dimethylpiperazine (20.15 grams; 0.1177 mole) dissolved in benzene. The addition was carried out with stirring and cooling and at a temperature of from 20° to 25° C. During the addition a white crystalline solid precipitated in the reaction mixture. Upon completion of the reaction, as evidenced by the substantial cessation of the formation of precipitate, the precipitate was separated by filtration to obtain a quantative yield of a 3-(2,5-dimethyl-1-piperazinyl)-propyldithiocarbamic acid product. The product was found to melt at 125°–128° C.

*Example 3.—3 - (4 - (3 - aminopropyl) - 2,5 - dimethyl-1-piperazinyl)propyldithiocarbamic acid*

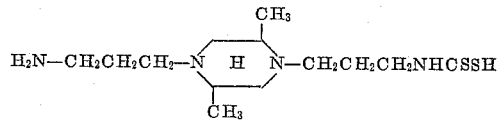

5.03 grams (0.0662 mole) of carbon disulfide dissolved in 300 grams of benzene was slowly added portionwise to 1,4 - bis(3 - aminopropyl) - 2,5 - dimethyl - 1 - piperazine (15.1 grams; 0.0662 mole). The addition was carried out with stirring and cooling and at a temperature of 20°–25° C. During the addition a crystalline solid precipitated in the reaction mixture. Upon completion of the reaction, as evidenced by the substantial cessation of formation of precipitate, the precipitate was separated by filtration to obtain 18 grams (90 percent yield) of 3 - (4 - (3 - aminopropyl) - 2,5 - dimethylpiperazinyl)-propyldithiocarbamic acid product. The product was found to melt with some decomposition at 54° C.

In a similar manner other piperazinylalkyldithiocarbamic acids may be prepared.

4-(1-piperazinyl)butyldithiocarbamic acid employing 1-(4-aminobutyl)piperazine and carbon disulfide.

1 - methyl - 3 - (1 - piperazinyl)propyldithiocarbamic acid employing 1-(3-aminobutyl)piperazine and carbon disulfide.

2 - (4 - aminoethyl - 2,5 - dimethyl - 1 - piperazinyl)-ethyldithiocarbamic acid employing 1,4-bis(2-aminoethyl)2,5-dimethylpiperazine and carbon disulfide.

The compounds have been tested and found to be useful as parasiticides, e. g., killing of fungi. For such use the products may be dispersed on an inert finely divided solid and employed as dusts. Also, such mixtures may be dispersed in water with the aid of a wetting agent and the resulting aqueous suspensions employed as sprays. In other procedures, the products may be employed as constituents of oil-in-water emulsions or water dispersions with or without the aid of wetting, dispersing or emulsifying agents.

In representative operations, substantially complete controls of tomato early blight (*Alternaria solani*) were obtained when employing 3-[4-(3-aminopropyl)-2,5-dimethylpiperazinyl]propyldithiocarbamic acid in a spray composition applied to the foliage of the plants to the point of run-off and at a dosage of 0.5 pound of toxicant per 100 gallons of ultimate mixture.

We claim:

1. A (1-piperazinyl)alkyldithiocarbamic acid having the formula $$R-N \overset{X}{\underset{X}{\diamond}} N-C_nH_{2n}NHCSSH$$

wherein R represents a member selected from the group consisting of hydrogen and lower aminoalkyl, each X represents a member selected from the group consisting of hydrogen and methyl and $n$ represents an integer of from 2 to 4, inclusive.

2. 2-(1-piperazinyl)ethyldithiocarbamic acid.
3. 3 - (2,5 - dimethyl - 1 - piperazinyl)propyldithiocarbamic acid.
4. 3 - [4 - (3 - aminopropyl) - 2,5 - dimethyl - 1 - piperazinyl]propyldithiocarbamic acid.
5. A method for the preparation of (1-piperazinyl)alkyl dithiocarbamic acids which comprises the step of reacting an aminoalkyl piperazine with carbon disulfide said aminoalkyl piperazine having the formula $$R-N \overset{X}{\underset{X}{\diamond}} N-C_nH_{2n}NH_2$$

wherein R represents a member selected from the group consisting of hydrogen and lower aminoalkyl, each X represents a member selected from the group consisting of hydrogen and methyl and $n$ represents an integer of from 2 to 4, inclusive.

No references cited.